United States Patent
Weigl

(10) Patent No.: US 10,293,430 B2
(45) Date of Patent: May 21, 2019

(54) METHOD AND DEVICE FOR DETECTING THE MECHANICAL FORCES AT THE WELDING PIN TIP DURING FRICTION STIR WELDING

(71) Applicant: Grenzebach Maschinenbau GmbH, Asbach-Baeumenheim (DE)

(72) Inventor: Markus Weigl, Donauwoerth (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 227 days.

(21) Appl. No.: 15/128,503

(22) PCT Filed: Apr. 9, 2015

(86) PCT No.: PCT/DE2015/000177
§ 371 (c)(1),
(2) Date: Sep. 23, 2016

(87) PCT Pub. No.: WO2015/154744
PCT Pub. Date: Oct. 15, 2015

(65) Prior Publication Data
US 2018/0193943 A1    Jul. 12, 2018

(30) Foreign Application Priority Data

Apr. 10, 2014    (DE) .................... 10 2014 005 315

(51) Int. Cl.
*B23K 20/12*    (2006.01)
*G01L 1/26*    (2006.01)
*G01L 1/16*    (2006.01)

(52) U.S. Cl.
CPC .......... *B23K 20/123* (2013.01); *B23K 20/121* (2013.01); *B23K 20/128* (2013.01); *G01L 1/162* (2013.01); *G01L 1/26* (2013.01)

(58) Field of Classification Search
None
See application file for complete search history.

(56) References Cited

U.S. PATENT DOCUMENTS 6,497,355 B1 * 12/2002 Ding ................... B23K 20/123
228/102
6,732,900 B2    5/2004 Hansen et al.
(Continued)

FOREIGN PATENT DOCUMENTS

DE          20321807 U1 *  5/2010 ........... B23K 11/311
DE      102012010836       5/2012
(Continued)

*Primary Examiner* — Devang R Patel
(74) *Attorney, Agent, or Firm* — Duane Morris LLP; Gregory M. Lefkowitz; Jason M. Nolan

(57) ABSTRACT

The invention relates to a device and a method for detecting the mechanical forces at the welding pin tip during friction stir welding, having the following features: a) a strip-shaped sensor (3) at a long side of a tool cup (9) holding a welding pin pen (12) by way of a pin shaft (13) using a tool receiving cone (14), and also holding a welding shoe (11); b) a conical narrowed portion (20) in the further region of the tool-receiving cone (14), which serves to receive a sensor (18) for detecting the axial force, the torque and the bending moment at the welding pin pen (12); c) a further narrowed portion in the front region of the tool-receiving cone (14), having three sensors (24) distributed across the circumferences at a distance of 120 degrees; d) a sensor signal amplifier having a rotor antenna (19) for receiving, amplifying and forwarding all detected measurement values, said measurement values being forwarded by a static antenna (17) to a machine control; and e) an inductive power supply system.

6 Claims, 3 Drawing Sheets

(56) References Cited

U.S. PATENT DOCUMENTS

| | | |
|---|---|---|
| 7,537,150 B2 | 5/2009 | Burton et al. |
| 7,721,610 B2 | 5/2010 | Ohta et al. |
| 8,196,300 B2 | 6/2012 | Imamura et al. |
| 2006/0169740 A1* | 8/2006 | Fukuhara ............. B23K 20/125 228/2.1 |
| 2007/0228104 A1* | 10/2007 | Mankus ............. B23K 20/1235 228/101 |
| 2009/0001974 A1* | 1/2009 | Sheiretov ................ G01L 1/125 324/209 |
| 2009/0294511 A1* | 12/2009 | Fleming ............... B23K 20/125 228/103 |

FOREIGN PATENT DOCUMENTS

| | | | |
|---|---|---|---|
| DE | 202012103219 | 8/2012 | |
| DE | 202014003072 | 4/2014 | |
| DE | 202014003072 U1 * | 4/2014 | ......... B23K 20/1245 |
| JP | 2002066763 | 3/2002 | |
| JP | 2015036174 | 2/2015 | |

* cited by examiner

METHOD AND DEVICE FOR DETECTING THE MECHANICAL FORCES AT THE WELDING PIN TIP DURING FRICTION STIR WELDING

CROSS-REFERENCE TO RELATED APPLICATIONS

This application is a § 371 national stage entry of International Application No. PCT/DE2015/000177, filed Apr. 9, 2015, which claims priority to German Patent Application No. 10 2014 005 315.6 filed Apr. 10, 2014, the entire contents of which are incorporated herein by reference.

The invention relates to a method and to a device for detecting the mechanical forces at the welding pin tip in the procedure of friction stir welding.

Friction stir welding was developed in the early nineties of the last century. Friction stir welding in the meantime is now successfully employed inter alia for welding aluminum alloys in many relevant industrial sectors. The applications herein range from individual pieces and small runs up to large volumes. Apart from the outstanding quality of the weld seam, the high level of reproducibility and the minor preparatory works and efforts for post-processing further contribute to the economic success. This method may be readily automated, permitting quality monitoring based on machine monitoring.

In the case of friction stir welding, friction heat by means of the friction between a rotating tool which is simultaneously moved in a translational manner and is impinged with pressure is generated in the joining region of the materials to be connected. The tool is moved along the joining region and stirs the plasticized material in the interior of the seam of the mutually abutting materials to be connected. The pressure exerted presses the plasticized material together. The tool is withdrawn from the connection region at the end of this seam, and the weld seam is capable of being immediately stressed.

The following publications are mentioned in relation to the prior art:

A pressure welding device which is based on the objective of demonstrating a process-based welding technique, in particular a friction stir welding technique, which is improved in comparison with the known prior art is known from DE 20 2012 103 219 U1. To this end, the preamble of claim 1 proceeds from a process-based welding device, having a plasticizing installation and a compressing installation, for producing a welded connection between workpiece parts, wherein the process-based welding device has a clamping device, rotatable about a rotation axis, having a rotary drive for a first workpiece part, and a further clamping device for a further, in particular a second workpiece part, and an indexing device for mutually converging the clamping devices.

In order for the mentioned objective to be achieved, it is claimed according to the features in the characterizing part of claim 1 that the pressure welding device has a measuring means measuring in a contactless manner for detecting the surface property and/or the true running and/or the axial runout in a front-end welding region of a workpiece part.

A method and a device for improving the quality of the weld seam in friction stir welding are known from DE 10 2012 010 836 B3, the latter emanating from the applicant, the method and the device being based on the objective of increasing the service life of the friction stir tool from approx. 2 hours to 15 hours, and to increase the quality of the joint seam such that no post-processing at all is required. This is achieved by a device having the following features:

a) a receptacle plate (1) having a drive head (2) and a spindle bearing (4) for receiving a friction stir welding tip (9), wherein a helically machined conveying screw (6) which serves for conveying away any non-required material application in the spindle bearing (4) opens into openings (8) which obliquely lead to the outside;

b) the longitudinal axis of the spindle bearing (4) in relation to the vertical is inclined by an angle of 2.8 to 3.2 degrees;

c) the sliding face of the rotating spindles is composed of a planar sliding face (10) and, in particular in order to weld curved seams from in each case one inherently vaulted sliding face (11) adjoining on two opposite sides, each of which sliding face (11) being inclined at an acute angle toward the sliding face (11);

d) the friction stir welding tip (9) has the shape of a truncated cone in which the covering area is raised in the center, and wherein the surface area of the truncated cone is formed by six trapezoidal area pieces, of which three area pieces each lie opposite one another at an angle of 120 degrees, being uniformly distributed on the circumference, and occupy a proportion of more than ⅙ on the circular circumference.

In order for the axial contact pressure and the torque arising in friction stir welding to be controlled in a precise manner, it is important that the process parameters at the point of the welding process are known. This is difficult above all when measuring force, torque, or the like, in the case of the components to be joined must be performed close to the welding action, such as in three-dimensional applications, for example, in which complex compensation of the dead weight of the spindle and of the tool has otherwise to be performed. Furthermore, measuring to date has been performed by gravity sensors which are very remote from the effective location and thus, by virtue of leveraging errors and of large effective spacings, are error prone.

The present invention is therefore based on the object of optimizing the welding procedure in friction stir welding in such a manner that the salient process parameters such as the arising axial force of the tool, the arising torque, and the temperature of the welding pin tip may be precisely detected even in three-dimensional applications.

This object is achieved by the device as claimed in claim 1, a device for detecting the mechanical forces at the welding pin tip in the procedure of friction stir welding, the device having the following features:

a) a strip-shaped sensor (3) on a longitudinal side of a tool bell (9) which by way of a pin shaft (13) by means of a tool receptacle conus (14) and a welding shoe (11) holds a welding pin (12), wherein the sensor (3) is configured for determining force, pressure, or path, and is attached to that side of the tool bell (9) that is counter to the flow direction of the welding process;

b) a tailored conus feature (20) in the comparatively wide region of the tool receptacle conus (14), which serves for receiving a sensor (18) for determining the axial force, the torque, and the bending moment at the welding pin (12);

c) a further tailored conus feature in the forward region of the tool receptacle conus (14), having at least three sensors (24), which are distributed on the circumference so as to be spaced apart by 120 degrees, and a piezoelectric force-measuring sensor 25 in the longitudinal axis of the pin shaft (13);

d) a sensor signal amplifier having a rotary antenna (19) for receiving, for amplifying, and for transmitting all detected measured values, wherein these measured values are transmitted by a static antenna (17) to a machine controller;

e) an inductive power supply system for supplying the measuring system from a moving secondary coil (22) and from a stationary primary coil (23).

It is furthermore claimed that the evaluation of the measured results is also utilized for controlling the longitudinal dimension of a pin adjustment element (15).

It is moreover claimed that during or after the welding process, fresh air and/or cleaning fluid may be infed by means of a connector 21. A method is claimed, said method being a method for detecting the mechanical forces at the welding pin tip in the procedure of friction stir welding, the method having the following features:

a) the mechanical forces of interest, which act on the tool parts, are detected by the installation of sensors on moving and stationary points of the tool performing a friction stir weld;

b) transmission of the detected measured values is performed by means of a system of a moving antenna (19) and a stationary antenna (17), wherein the measured values are amplified and infed to an evaluation unit, and the power supply is performed by way of induction by means of a stationary primary coil (22) and a moving secondary coil (23);

c) the detected measured values are evaluated and used for fundamentally regulating the respective welding process.

It is claimed that the evaluation of the measured values is also utilized for controlling the longitudinal dimension of a pin adjustment element (15) for adjusting the welding pin tip (12). It is furthermore claimed that during or after the welding process, fresh air and/or cleaning liquid is infed by means of a connector (21). And a computer program having a program code for carrying out the method steps, if and when the program is executed in a computer. Likewise a machine-readable carrier having the program code of a computer program for carrying out the method, if and when the method is executed in a computer.

The device according to the invention will be described in more detail hereunder. In the figures and in detail:

Figure 1:
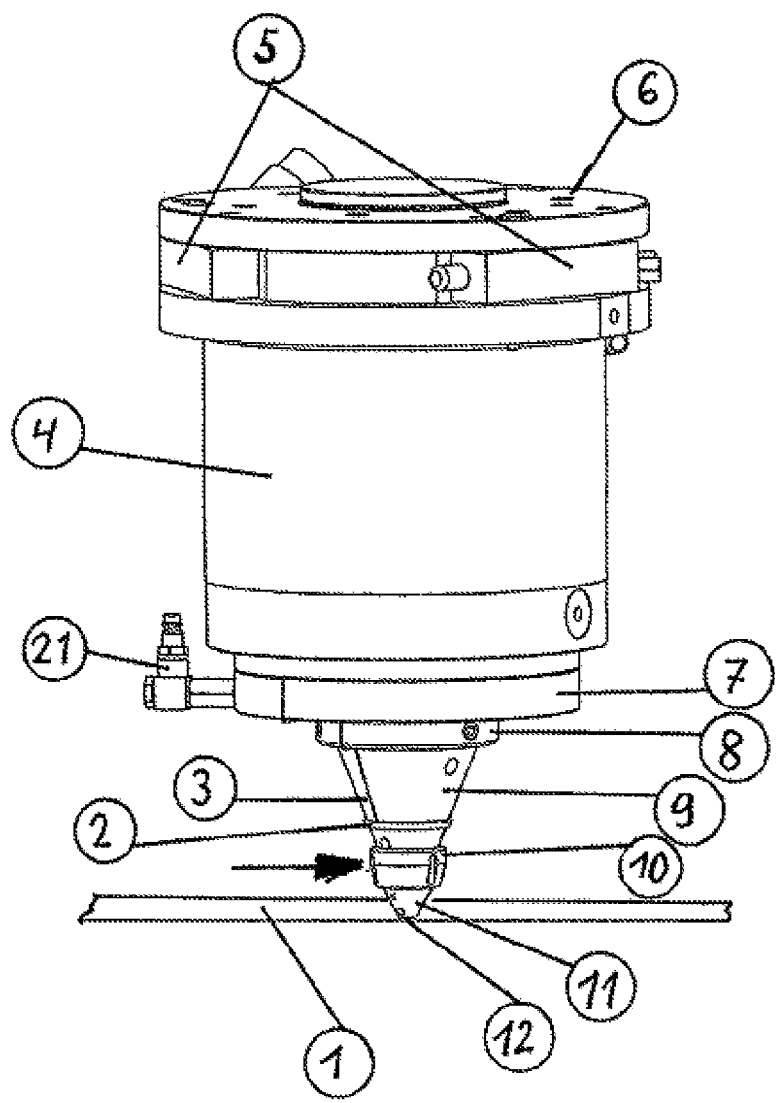
FIG. 1 shows a side view of an assembly for friction stir welding.

FIG. 1 shows a side view of an assembly for friction stir welding. A component to be joined, in the manner of two metal surfaces to be welded, is herein referenced with 1. This purpose is served by a friction stir welding head which has a gearbox 4 which by means of a flange 6 may be fastened to a robotic arm which controls the procedure of friction stir welding. A direct motor may also be used instead of a gearbox. Such a robotic arm is not illustrated here. Path readers 5, of which two are illustrated here, serve for measuring the pressure by way of which the robotic arm presses on the friction stir welding head. Herein, these may also be sensors for measuring force, pressure, or a path. A fastening plate 7 for fastening a tool-bell flange 8 to the gearbox or to the direct motor 4, respectively, can be seen in the lower region of the gearbox or of the direct motor 4, respectively. A tool bell 9 which on its part by way of a union nut 10 fixes a welding shoe 11 is in turn mounted by means of the flange 8. A welding pin tip 12 is then connected by the welding shoe 11 to the component 1 to be joined.

Fresh air and/or cleaning liquid may be conveyed to the region of the tool bell 9 by means of a connector 21. More details to this end will be discussed in the description relating to FIG. 2.

A sensor 3 in the form of a strain gauge on the external side of the tool bell 9 serves for detecting the forces acting on the tool bell 9 during the operation of friction stir welding. The strain gauge here is exemplary; this may also be a sensor 3 for determining force, pressure, or a path. This strain gauge which is attached in the longitudinal direction to the external side of the tool bell 9 is attached to that side of the tool bell 9 that is counter to the processing direction for the reason that the strongest deformation of the tool bell 9 is to be expected here. An amplifier 2 which is simultaneously referenced with the antenna thereof serves for amplifying the measured signal determined by the sensor 3.

Figure 2:
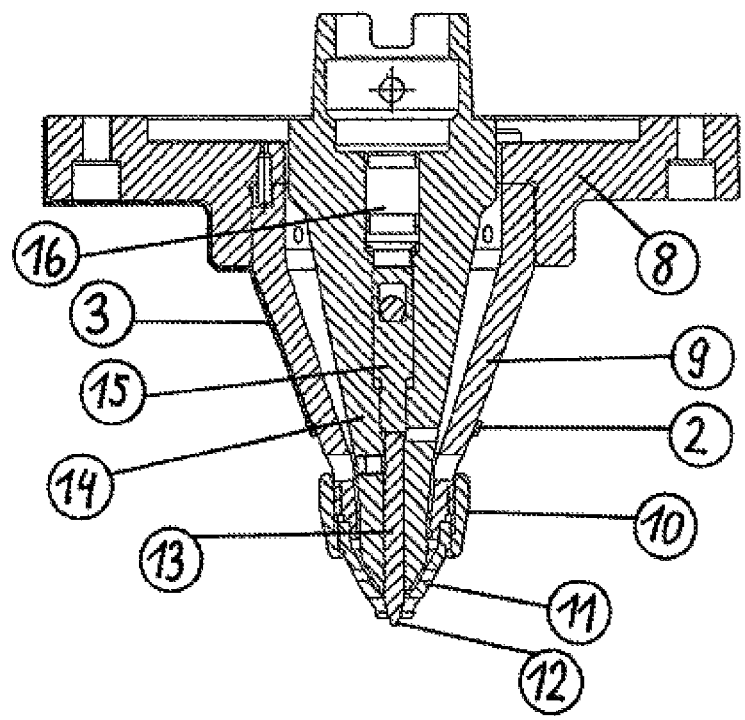
FIG. 2 shows an illustration of the detection of measured values.

FIG. 2 shows an illustration of the detection of measured values.

Here, the tool-bell flange 8, known from FIG. 1, which is connected to the tool bell 9 can be seen here in a sectional manner. The sensor 3, which is drawn with a bold line, can be identified on the tool bell 9 at the left periphery of the connection between the tool-bell flange 8 and the tool bell 9. The amplifier 2, connected to the antenna thereof, of the measured signal of the sensor 3 is illustrated in the lower region of the sensor 3. The power supply to this system is performed by way of induction by means of corresponding devices which run in the interior of the tool bell 9 and are described at a later stage.

A tool receptacle conus 14 which in the longitudinal axis thereof guides a pin shaft 13 having a prominent welding pin tip 12 is mounted so as to be central in the interior of the tool bell 9, wherein the welding pin tip 12 by way of the welding shoe 11 is connected to the tool bell 9 by means of the union nut 10. The pin shaft 13 is connected to a counter-bearing 16 by way of a pin adjustment element 15. An electronically actuatable piezo adjustment element (not illustrated in more detail here) may serve here as the pin adjustment element 15.

Figure 3:
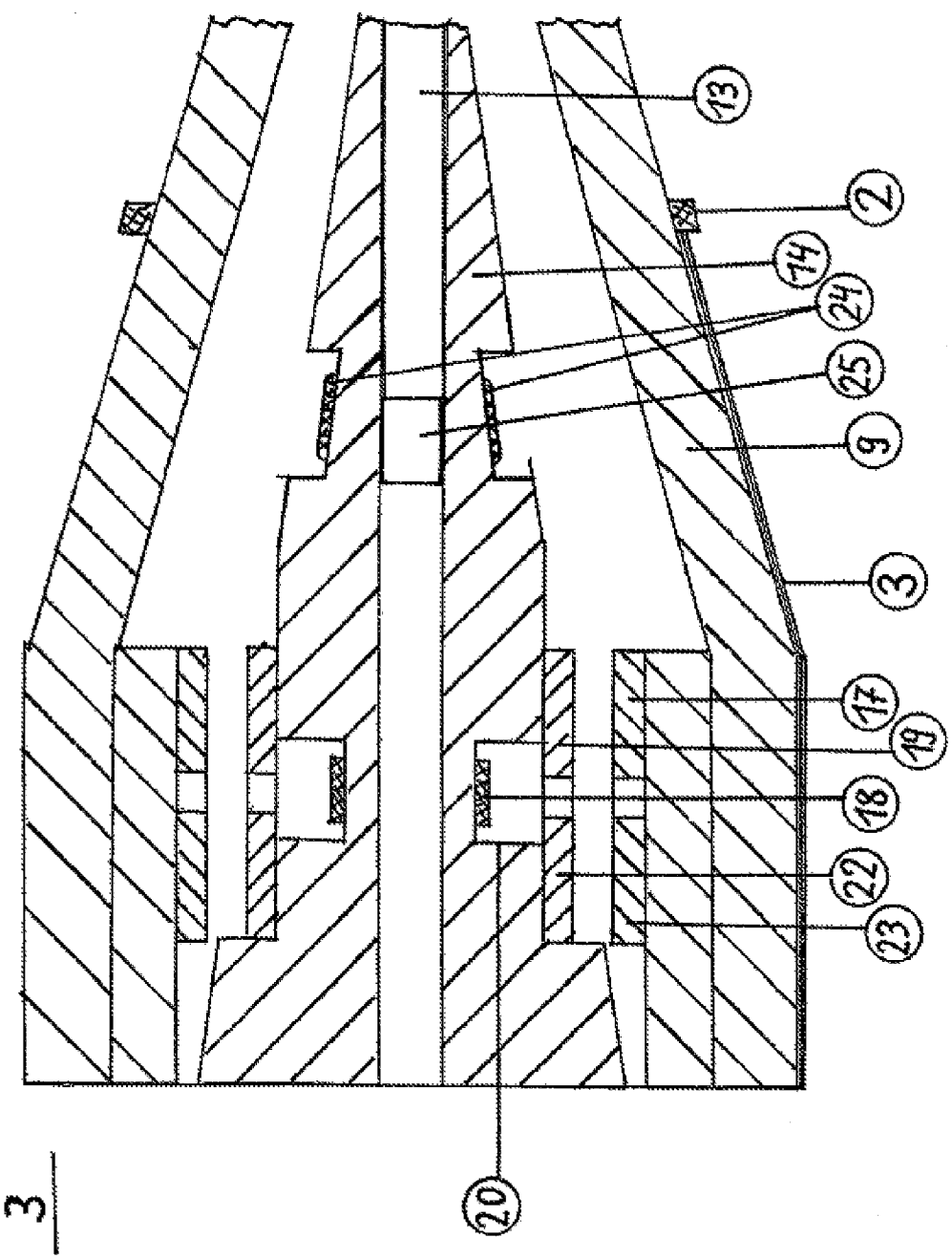
FIG. 3 shows details of the detection of measured values.

FIG. 3 shows details of the detection of measured values. In this illustration, the tool bell 9 having the tool receptacle conus 14 is illustrated in a stylized sectional manner. The sensor 3, which has been described earlier, and the associated amplifier 2 having the antenna thereof, can again be seen on the lower side, shown in a sectional manner, of the tool bell 9.

A tailored conus feature 20 which serves for receiving a sensor 18 can be seen on the tool receptacle conus 14 shown, having the pin shaft 13, in the comparatively wide region of said tool receptacle conus 14. This tailored feature herein is deliberately highlighted but may also be omitted. The mechanical cross-sectional constriction by way of the tailored conus feature 20, and the placement of the sensor 18 which has been performed at this point, enable the axial force and the torque which engage on the tool receptacle conus 14 to be measured, and a bending moment which arises here to be measured. The transmission of the signal of the measured values determined by the sensor 18 is performed by way of a signal amplifier 19, which is conjointly rotatable with the tool receptacle conus 14, and a rotary antenna. The reception and transmission of the measured values determined by the sensor 18 is performed by a static fixed antenna 17.

A further tailored feature, not illustrated in more detail, which provides space for strain gauges 24 and which enables the axial force acting directly on the pin shaft 13 and thus on the welding pin tip 5 to be measured is located in the forward region of the tool receptacle conus 14. The strain gauges 24 are composed of three strips, for example, which are attached in the illustrated tailored feature so as to be distributed at a spacing of 120 degrees on the circumference of the tool receptacle conus 14. More than three strips may also be attached here, so as to be distributed on the circumference. A piezoelectric force-measuring sensor 25, which also serves for measuring the axial force, may optionally be additionally located in the longitudinal axis of the pin shaft 13. During operation and for particularly sensitive processes, the measured values of the sensors 24 and 25 may be simultaneously detected and mutually correlated, so as to exclude measuring errors. The reception and transmission of the measured values determined by the sensors 24 and 25 is likewise performed by way of the static fixed antenna 17.

An inductive power supply, the static primary coil thereof being referenced with 23, and the movable secondary coil thereof being referenced with 22, serves for supplying power to the described measuring system.

The complex controller of the described movement sequences requires a special control program.

LIST OF REFERENCE SIGNS

1 Component to be joined
2 Amplifier of the measurement signal of a tool bell and antenna
3 Sensor on the tool bell 9 (strain gauge)
4 Gearbox or direct motor for a friction stir welding head
5 Path reader for a flange of a friction stir welding head
6 Flange for connecting to a robotic arm
7 Fastening plate for a tool-bell flange
8 Tool-bell flange
9 Tool bell
10 Union nut
11 Welding shoe
12 Welding pin tip
13 Pin shaft
14 Tool receptacle conus
15 Pin adjustment element
16 Counter-bearing for the pin
17 Static antenna
18 Sensor (strain gauge, for example) for the tool receptacle conus 14
19 Sensor signal amplifier and rotary antenna
20 Tailored conus feature for receiving a sensor (elastic point)
21 Connector for fresh air and/or cleaning liquid
22 Inductive power supply, secondary coil
23 Inductive power supply, primary coil
24 Sensor for measuring an axial force
25 Piezoelectric force-measuring sensor

The invention claimed is:

1. A friction stir welding device for detecting mechanical forces during friction stir welding, the friction stir welding device comprising:
  a) a tool bell comprising a tool receptacle conus and a welding pin having a pin shaft and pin tip, wherein the welding pin is connected to the tool bell by a welding shoe;
  b) a strip-shaped sensor attached to a longitudinal, external side of the tool bell, wherein the strip-shaped sensor is configured for determining force, pressure, or path;
  c) a sensor positioned in a tailored conus feature in the tool receptacle conus, wherein the sensor is configured for determining an axial force, a torque, and a bending moment at the welding pin;
  d) at least three sensors distributed at a spacing of 120 degrees around a circumference of the tool receptacle conus;
  e) a piezoelectric force-measuring sensor located along a longitudinal axis of the pin shaft;
  f) a sensor signal amplifier comprising a rotary antenna for receiving, for amplifying, and for transmitting all detected measured values measured by the sensor, wherein the measured values are transmitted by a static antenna to a machine controller;
  g) an inductive power supply system comprising a moving secondary coil and a stationary primary coil, wherein both coils are positioned within the tool bell.

2. The device as claimed in claim 1, further comprising a pin adjustment element connected to the pin shaft, wherein the pin adjusting element is configured to adjust the pin tip in a longitudinal dimension.

3. The device as claimed in claim 1, further comprising a connector configured to receive fresh air and/or cleaning fluid.

4. A method for detecting mechanical forces during friction stir welding, the method comprising:
  a) providing a friction stir welding device according to claim 1;
  b) instructing the sensors to detect and measure the mechanical forces acting on the friction stir welding device;
  c) transmitting the detected and measured values of the mechanical forces with a system comprising the rotary antenna and the static antenna, wherein the measured values are amplified and transmitted to an evaluation unit; and
  d) evaluating the detected and measured values of the mechanical forces for regulating the friction stir welding.

5. The method as claimed in claim 4, wherein the evaluating step includes controlling a longitudinal dimension of a pin adjustment element for adjusting the welding pin tip.

6. The method as claimed in claim 4, wherein fresh air and/or cleaning liquid is added to the device through a connector.

* * * * *